(12) United States Patent
Matsushita

(10) Patent No.: US 7,654,366 B2
(45) Date of Patent: Feb. 2, 2010

(54) HYDRAULIC DISC BRAKE LEVER ASSEMBLY

(75) Inventor: Tatsuya Matsushita, Osaka (JP)

(73) Assignee: Shimano Inc., Sakai, Osaka (JP)

(*) Notice: Subject to any disclaimer, the term of this patent is extended or adjusted under 35 U.S.C. 154(b) by 682 days.

(21) Appl. No.: 11/358,476

(22) Filed: Feb. 18, 2006

(65) Prior Publication Data

US 2006/0185941 A1  Aug. 24, 2006

Related U.S. Application Data

(63) Continuation-in-part of application No. 11/156,501, filed on Jun. 17, 2005, now Pat. No. 7,377,367, which is a continuation-in-part of application No. 11/061,358, filed on Feb. 18, 2005, now Pat. No. 7,308,791.

(51) Int. Cl.
B62L 3/00 (2006.01)

(52) U.S. Cl. .................................. 188/24.22; 188/344

(58) Field of Classification Search ............... 188/72.9, 188/344, 24.11, 24.22, 26, 151 R, 152; 74/551.8; 60/547.1, 576, 588, 594; 92/113
See application file for complete search history.

(56) References Cited

U.S. PATENT DOCUMENTS

| | | | |
|---|---|---|---|
| 3,935,930 A | 2/1976 | Kine | |
| 4,494,800 A | 1/1985 | Hayashi | |
| 4,560,049 A | 12/1985 | Uchibaba | |
| 4,779,482 A | 10/1988 | Kawaguchi | |
| 4,840,082 A | 6/1989 | Terashima | |
| RE33,578 E | 4/1991 | Bass | |
| 5,050,381 A | 9/1991 | Matsuno | |
| 5,636,518 A | 6/1997 | Burgoyne | |
| 5,678,665 A | 10/1997 | Debreczeni | |
| 5,813,501 A | 9/1998 | Terry | |
| 6,119,821 A | 9/2000 | Chiang | |
| 6,263,754 B1 * | 7/2001 | Wesling et al. ................. 74/489 |
| 6,336,327 B1 | 1/2002 | Noro | |
| 6,491,144 B2 | 12/2002 | Ueda | |
| 6,527,303 B2 | 3/2003 | Kariyama | |
| 6,883,647 B1 | 4/2005 | Wen | |
| 7,308,791 B2 * | 12/2007 | Takizawa et al. ........... 60/547.1 |
| 7,377,367 B2 * | 5/2008 | Takizawa et al. ........... 188/72.9 |
| 2003/0121736 A1 | 7/2003 | Lumpkin | |
| 2003/0121739 A1 | 7/2003 | Lumpkin | |

FOREIGN PATENT DOCUMENTS

| | | |
|---|---|---|
| DE | 32 16 885 A1 | 11/1983 |
| DE | 43 40 379 | 3/1995 |
| DE | 200 11 368 | 11/2000 |

(Continued)

*Primary Examiner*—Pam Rodriguez
(74) *Attorney, Agent, or Firm*—Jeffer Mangels Butler & Marmaro LLP

(57) ABSTRACT

A brake lever assembly for actuating a hydraulic system is shown and described. The brake lever assembly comprises a housing, a master cylinder disposed in the housing, and a master piston disposed in the master cylinder. The master piston has an adjustable dead band. A lever is connected to the housing and has an adjustable reach. The lever is pivotable about a first axis to adjust the reach and is pivotable about a second axis to actuate the master piston.

20 Claims, 9 Drawing Sheets

FOREIGN PATENT DOCUMENTS

| | | |
|---|---|---|
| DE | 100 17 198 A1 | 10/2001 |
| DE | 100 17 199 A1 | 10/2001 |
| DE | 10017199 A1 | 10/2001 |
| EP | 0173513 A2 | 3/1986 |
| EP | 0405945 A2 | 1/1991 |
| EP | 0 417 982 A2 | 3/1991 |
| EP | 0 405 945 | 4/1994 |
| EP | 0792795 A2 | 9/1997 |
| EP | 0893337 A2 | 1/1999 |
| EP | 1 160 152 | 12/2001 |
| EP | 1 351 847 | 7/2004 |
| EP | 1 007 404 | 10/2004 |
| EP | 0 514 757 A1 | 3/2005 |
| EP | 1514791 A1 | 3/2005 |
| EP | 1526066 A2 | 4/2005 |
| GB | 2 321 682 | 8/1998 |
| JP | 01-237282 | 9/1989 |
| JP | 06-032275 | 2/1994 |
| JP | 07-187047 | 7/1995 |
| JP | 08 114244 A | 5/1996 |
| JP | 08-268369 | 10/1996 |
| JP | 10-129567 | 5/1998 |
| JP | 10-230886 | 9/1998 |
| JP | 2002-068067 | 3/2002 |
| JP | 2002068067 | 3/2002 |
| JP | 2002-211473 | 7/2002 |
| WO | WO94/21510 A | 9/1994 |
| WO | WO99/55567 A | 11/1999 |

* cited by examiner

HYDRAULIC DISC BRAKE LEVER ASSEMBLY

RELATED APPLICATIONS

This application is a continuation-in-part of application Ser. No. 11/156,501, filed Jun. 17, 2005, now U.S. Pat. No. 7,377,367, which is a continuation-in-part of application Ser. No. 11/061,358, filed on Feb. 18, 2005, now U.S. Pat. No. 7,308,791, the entireties of both which are incorporated by reference herein.

FIELD OF THE INVENTION

The present invention relates hydraulic disc brakes, and more particularly, to a hydraulic disc brake lever assembly preferably for a bicycle.

BACKGROUND OF THE INVENTION

In recent years, certain high performance bicycles have included hydraulic disc brakes. Hydraulic disc brake systems typically include a caliper housing, a first movable brake pad and a second fixed or movable brake pad. The movable brake pad is typically attached to a piston that is movable in response to fluid pressure applied via a hydraulic fluid conduit in the caliper housing. The brake pads are positioned on either side of a rotor, which is attached to the front or rear wheel of a bicycle. Upon the application of fluid pressure to the piston or pistons, the brake pads come into contact with the rotor, thereby applying frictional resistance and causing the bicycle to slow down or stop.

Hydraulic disc brake systems for bicycles are typically actuated by a brake lever attached to a bicycle handlebar. They also typically include a master piston in a master cylinder which is actuated by the brake lever. The master cylinder contains a hydraulic fluid and is in fluid communication with the disc brake caliper via a fluid conduit. The brake pads are typically spaced apart from the rotor by a predetermined gap. As the lever is contracted towards the handlebar, the master piston moves, thereby forcing liquid out of the master cylinder and into a conduit connected to the caliper housing. The movement of fluid into the caliper housing causes the pistons to move, eventually bringing the brake pads into contact with the rotor. Once the brake pads contact the rotor, they provide frictional resistance which can be increased by further operation of the lever. At this point, the caliper housing is fully pressurized, and further operation of the lever increases the system hydraulic pressure and frictional resistance applied to the rotor.

When operating hydraulic disc brake systems, no braking will occur until the brake pads come into contact with the rotor. Thus, there is a "dead band," as the rider begins to contract the brake lever during which no braking occurs. To compensate for the dead band, riders may initially contract the brake lever quickly to obtain pad to rotor contact and then more slowly to increase the frictional resistance to the desired level. As a result, braking is not smooth. Also, a hydraulic brake system may include a left side lever for a rear disc brake caliper and a right side lever for a front disc brake caliper (or vice-versa). When the left and right side levers operate at the same time, both front brake pads and rear brake pads do not contact the rotors at the same time. In other words, the levers are uneven when the pads contact the rotors.

In addition, certain known systems have an adjustable dead band. However, in many of these systems, the lever's reach is affected by variations in the dead band. Conversely, certain known systems include an adjustable reach feature. However, many of them do not allow for adjustment of the dead band, or if they do provide for dead band adjustment, it cannot be made without affecting the lever's reach.

Thus, a need has arisen for a hydraulic disc brake lever which addresses the foregoing problems.

SUMMARY OF THE PREFERRED EMBODIMENTS

According to a first aspect of the present invention, a master cylinder assembly is provided. The master cylinder assembly comprises a master cylinder having a length defining an axis, a top end and a bottom end. A first piston is disposed in and movable within the master cylinder, and a second piston is disposed in and movable within the master cylinder. The master cylinder defines a threshold distance along the axis from the top end of the master cylinder. The first piston preferably defines a distance along the axis from the top end of the master cylinder. The second piston is preferably operatively connected to the first piston. When the distance from the first piston to the top end of the master cylinder is at least the threshold distance, the second piston is preferably movable with respect to the first piston.

In a preferred embodiment, when the distance from the first piston to the top end of the master cylinder is less than the threshold distance, the second piston is not movable with respect to the first piston. In another preferred embodiment, the first piston has an opening, at least a portion of the second piston is disposed in the opening, and when the distance from the first piston to the top end of the master cylinder is at least the threshold distance, the second piston is movable within the opening.

In accordance with yet another preferred embodiment, the second piston has a first piston engagement surface, the first piston has a second piston engagement surface, and the second piston engagement surface engages the first piston engagement surface when the distance from the first piston to the top end of the master cylinder is less than the threshold distance.

In accordance with other preferred embodiments, the master cylinder comprises a first fluid containing region having a fluid outlet, and the first piston, second piston, and master cylinder define a second fluid containing region. When the distance from the first piston to the top end of the master cylinder is less than the threshold distance, the first fluid containing region is in fluid communication with the second fluid containing region. In accordance with still other preferred embodiments, when the distance from the first piston to the top end of the master cylinder is at least the threshold distance, the first fluid containing region is substantially not in fluid communication with the second fluid containing region.

In accordance with another aspect of the present invention, a master cylinder assembly is provided which has a top end, a bottom end, and a length. The master cylinder defines a first movement region along a first portion of its length. The master cylinder assembly preferably comprises a master piston assembly comprising first and second pistons which are disposed in and movable within the master cylinder. In a preferred embodiment, when the master piston assembly is located within the first movement region, the first piston is movable together with the second piston, and when the master piston assembly is at least partially outside of the first movement region, the second piston is moveable with respect to the first piston.

In other preferred embodiments, the master cylinder further comprises a first lengthwise region along a second portion of its length having a first cross-sectional area and a second lengthwise region along a third portion of its length having a second cross-sectional area, and the first cross-sectional area is greater than the second cross-sectional area. In yet other preferred embodiments, a first biasing device is positioned between the top end of the master cylinder and the first piston, wherein the first biasing device biases the first piston away from the top end of the master cylinder. In still other preferred embodiments, the first and second lengthwise regions are shaped to cooperatively define a lip.

In accordance with another aspect of the present invention, a hydraulic disc brake lever assembly is provided. The assembly comprises a housing and a lever connected to the housing. The lever preferably has a neutral position, a first actuating position, and a second actuating position with respect to the housing. First and second pistons are also disposed within the housing and operatively connected to the lever. In a preferred embodiment, the movement of the lever from the neutral position to the first actuating position causes the first and second pistons to move together, and the movement of the lever from the first actuating position to the second actuating position causes the second piston to move with respect to the first piston.

In accordance with another aspect of the present invention, a master cylinder assembly is provided which comprises a master cylinder, first and second pistons disposed in the cylinder and a means for selectively causing the first and second pistons to move together within the master cylinder and for causing one of the first and second pistons to move with respect to the other of the first and second pistons.

In accordance with a further aspect of the present invention, a hydraulic brake lever system is provided. The system comprises a lever having a range of travel comprising first and second regions and a master cylinder assembly. The master cylinder assembly has hydraulic fluid contained therein and a fluid exit port. The lever is operatively connected to the master cylinder assembly. In a preferred embodiment, when the lever is in the first region, moving the lever a distance delivers a first volume of hydraulic fluid from the exit port and when the lever is in a second region, moving the lever the distance delivers a second volume of fluid from the exit port, and the first volume is greater than the second volume.

In accordance with yet another aspect of the present invention, a brake lever assembly is provided which comprises a housing, a lever connected to the housing and pivotable about a pivot axis, and a master cylinder assembly disposed in the housing. The master cylinder assembly preferably comprises a master piston operatively connected to the lever. The pivot axis has a position with respect to the housing which is preferably adjustable, and the master cylinder preferably has an adjustable dead band.

In preferred embodiments, the master piston has a non-actuated state and a seal, the master cylinder has a port, and the dead band is the distance between the seal and the port when the master piston is in the non-actuated state. In other preferred embodiments, the lever has a shaft and an adjustable connector disposed through the shaft, and moving the adjustable connector with respect to the shaft adjusts the dead band. In still other preferred embodiments, the lever has a neutral position and a fully actuated position defining a reach between the neutral position and the fully actuated position, and the reach is adjustable.

In yet further preferred embodiments, the master cylinder has a longitudinal axis, and the pivot axis is spaced apart from the longitudinal axis. In still other preferred embodiments, the position of the pivot axis with respect to the housing is adjustable in a direction that is substantially parallel to the master cylinder's longitudinal axis. In additional preferred embodiments, the housing further comprises a pair of opposing slots, the lever includes a pivot shaft, the pivot shaft has a longitudinal axis defining the pivot axis, and the pivot shaft is movably disposed within the pair of opposing slots.

In accordance with still another aspect of the present invention, a brake lever assembly is provided which comprises a housing, a master cylinder disposed in the housing, and a lever connected to the housing and having a reach. The master cylinder comprises a master piston and preferably has an adjustable dead band. The lever is preferably pivotable about a first pivot axis to adjust the reach, and the lever is preferably pivotable about a second pivot axis to actuate the master piston. In preferred embodiments, the reach is adjustable independently of the dead band. In still other preferred embodiments, the dead band is adjustable independently of the reach. In other preferred embodiments, the lever has a first pivot shaft defining the first pivot axis and a second pivot shaft defining the second pivot axis, and the first pivot shaft is spaced apart from the second pivot shaft. In further preferred embodiments, the second pivot shaft is operatively connected to the master piston.

In yet additional preferred embodiments, an adjustable connector is disposed through the pivot shaft and operatively connected to the master piston, wherein moving the adjustable connector with respect to the pivot shaft adjusts the dead band.

In accordance with still another aspect of the present invention, a brake lever assembly is provided. The assembly comprises a housing, a lever, a master cylinder disposed in the housing, a master piston disposed in the master cylinder, a dead band adjustment device, and a reach adjustment device. The housing preferably has first and second pairs of opposing slots wherein the first and second pairs of opposing slots are spaced apart from one another. The lever preferably has a first pivot shaft disposed in the first pair of opposing slots and a second pivot shaft disposed in the second pair of opposing slots.

Preferably, the dead band adjustment device operatively connects the master piston to the second pivot shaft and is adjustable to vary the position of the master piston with respect to the second pivot shaft. The reach adjustment device preferably connects the housing to the first pivot shaft and is adjustable to vary the position of the first pivot shaft in the first pair of opposing slots.

In preferred embodiments, the lever has a neutral position and a fully-actuated position defining a reach between the neutral position and the fully-actuated position, and adjusting the position of the first pivot shaft in the first pair of opposing slots adjusts the reach.

In accordance with another aspect of the present invention, a method of adjusting the reach of a brake lever assembly is provided. The brake lever assembly includes a lever operatively connected to a master cylinder assembly, the lever has a neutral position, and the master cylinder assembly has a dead band that is adjustable without varying the lever's neutral position. The method preferably comprises pivoting the lever about a lever region that is substantially aligned with the master cylinder assembly. In preferred embodiments, the master cylinder assembly has a longitudinal axis, and the lever region defines a pivot axis that is substantially perpendicular to the master cylinder assembly's longitudinal axis.

In accordance with a further aspect of the present invention, a brake lever assembly is provided which comprises a master cylinder assembly having a dead band and a master piston disposed in a master cylinder. A means for adjusting the dead band is provided.

In accordance with still another aspect of the present invention, a brake lever assembly is provided which comprises a housing having a pair of opposing slots, a master cylinder disposed in the housing and having a port, and a master piston assembly disposed in the master cylinder. The master piston assembly preferably comprises a master piston having a seal. The master piston preferably has a non-actuated state defining a distance between the seal and the port when the master piston is in the non-actuated state. The first end of a lever is preferably pivotally connected to the housing. The lever preferably has a cross member spaced apart from the first end, and the cross member is preferably disposed in the pair of opposing slots. In a preferred embodiment, an adjustable connector operatively connects the cross member to the master piston assembly, and the adjustable connector is adjustable to vary the distance.

In other preferred embodiments, the adjustable connector abuttingly engages the master piston assembly. In further preferred embodiments, the master piston is biased towards the lever. In still other preferred embodiments, the adjustable connector is rotatable to vary the position of the adjustable connector with respect to the lever.

In yet other preferred embodiments, the brake lever assembly further comprises a first coupling member, wherein the adjustable connector has an adjustment end and an engagement end, the engagement end is connected to the first coupling member, and the first coupling member abuttingly engages the master piston assembly.

In still other preferred embodiments, the master piston assembly further comprises a second coupling member attached to the master piston, and the second coupling member abuttingly engages the first coupling member. In yet additional preferred embodiments, the master piston is a first master piston, the first master piston has a hole, and the second master piston is at least partially disposed in the hole. In other preferred embodiments, the adjustable connector has a longitudinal axis, the master cylinder has a longitudinal axis, and the adjustable connector's longitudinal axis is substantially parallel to the master cylinder's longitudinal axis.

In accordance with another aspect of the present invention, a brake lever assembly is provided which comprises a housing, a master cylinder disposed in the housing and having a port, and a master piston assembly disposed in the master cylinder. The master piston assembly preferably comprises a master piston, and the master piston preferably has a seal and a non-actuated state. A lever is pivotally connected to the housing and preferably has first and second forked portions and a space between the first and second forked portions. An adjustable connector is preferably disposed in the space and operatively connects the lever to the master piston. The seal and the port define a distance when the master piston is in the non-actuated state, and the adjustable connector is adjustable to vary the distance.

In preferred embodiments, the lever further comprises a cross member connecting the first forked portion and the second forked portion, and the adjustable connector is disposed through the cross member.

In accordance with another aspect of the present invention, there is provided a brake lever assembly configured to be attached to a handlebar that includes a housing and a brake lever pivotably secured to the housing at a pivot point. The brake lever includes a proximal end that defines an axis, is rotatable about a pivot axis and is movable in a first plane when the proximal end rotates about the pivot axis. The brake lever also includes a sloping transition that extends away from the axis of the proximal end at an angle, and a substantially flat region that is movable in a second plane when the proximal end rotates about the pivot axis. The first plane is oriented at an angle to the second plane and the sloping transition connects the substantially flat region to the proximal end. In a preferred embodiment, the housing includes a master cylinder assembly that defines a centerline disposed therein. The centerline of the master cylinder defines a cylinder plane that is not coplanar with the second plane. In a further embodiment the housing includes a clamp that has a centerline that defines a third plane that is coplanar with the second plane.

In accordance with yet another aspect of the present invention, there is provided a brake lever assembly that includes a housing that includes a clamp that has a centerline that defines a first plane, and a brake lever pivotably secured to the housing at a pivot point that is located below the first plane. The brake lever includes a proximal end that is rotatable about a pivot axis, is positioned below the first plane and defines an axis. The brake lever also includes a sloping transition that extends away from the axis of the proximal end at an angle and a substantially flat region that is movable in a plane that is substantially coplanar with the first plane when the proximal end rotates about the pivot axis. The sloping transition connects the substantially flat region to the proximal end.

In accordance with still another aspect of the present invention, there is provided a brake lever that includes a proximal end that defines an axis and is rotatable about a pivot axis and is movable in a first plane when the proximal end rotates about the pivot axis, a sloping transition that extends away from the axis of the proximal end at an angle, and a substantially flat region that is movable in a second plane when the proximal end rotates about the pivot axis. The first plane is oriented at an angle to the second plane and the sloping transition connects the substantially flat region to the proximal end.

The present invention is applicable to all types of devices and is not limited to bicycles.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
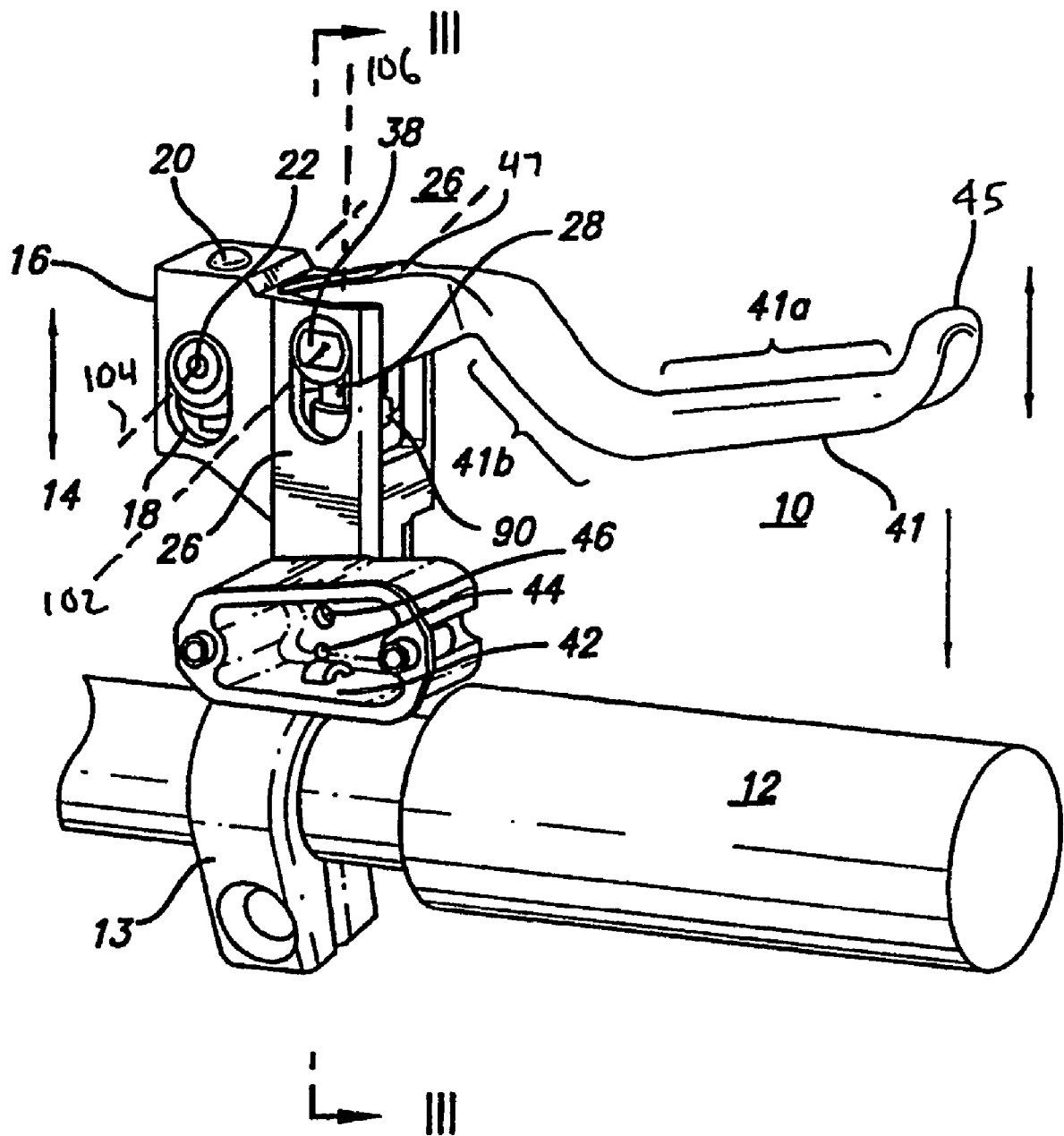
FIG. 1 is a first perspective view of a hydraulic disc brake lever assembly in accordance with a preferred embodiment of the present invention.

Referring to FIG. 1, a preferred embodiment of a bicycle brake lever assembly 10 is described. Brake lever assembly 10 is preferably a hydraulic brake lever assembly operatively connected to a hydraulic disc brake system.

Figure 2:
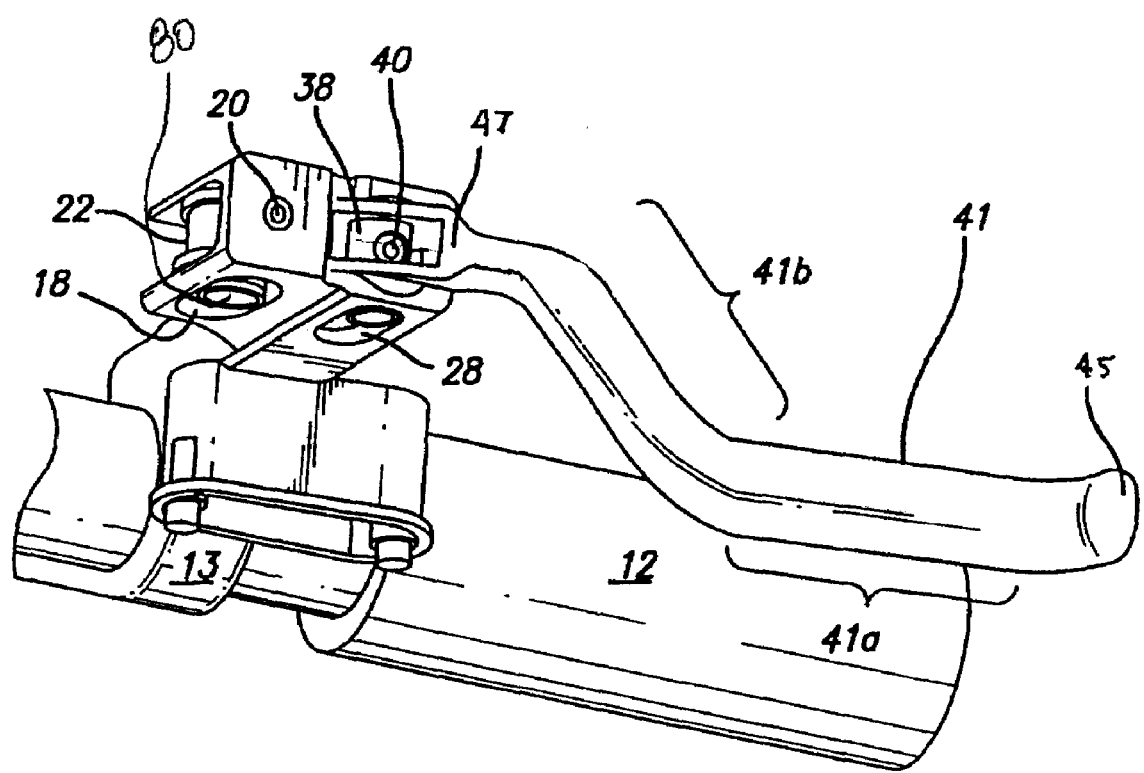
FIG. 2 is a second perspective view of the hydraulic disc brake lever assembly of FIG. 1.

As shown in FIGS. 1 and 2, brake lever assembly 10 is preferably attached to a bicycle handlebar 12 by a clamp 13 or other suitable attachment mechanism. Brake lever assembly 10 generally includes a housing 14 having a first section 16 and second section 26 and also includes a brake lever 41.

As is best shown in FIGS. 1-2 and 9-11, brake lever 41 is preferably an elongated member which includes a distal end 45 that is shaped to project away from handle bar 12. Lever 41 also includes proximal end 47 which engages housing 14. In an area lying between proximal end 47 and distal end 45, a relatively flat region 41a is provided which the bicycle rider uses to grip lever 10. Sloping transition 41b connects relatively flat region 41a to proximal end 47. It is preferred that sloping transition 41b and distal end 45 both project away from relatively flat region 41a to aid in retaining the rider's hand against lateral movement along the length of lever 41.

First section 16 of housing 14 is preferably configured to facilitate pivotal movement of lever 41. In a preferred embodiment, first section 16 includes a pair of slots 18, such as ovular slots or other suitable elongated slots, (only one of which is visible in FIG. 1) on opposite sides of housing 14. Lever 41 is preferably forked at its proximal end 47 (see FIG. 2). On each forked portion, an aperture is provided. The apertures are aligned with one another to define a spaced apart pair of aligned apertures.

Pivot member 22 is also retained within housing first section 16 by engaging slot pair 18 and by an adjustable fastener such as adjustment screw 20. Pivot member 22 is preferably cylindrical in shape and has a longitudinal axis 104 which defines a pivot axis about which brake lever 41 is rotatable.

As best shown in FIG. 2, adjustable fastener or adjustment screw 20 is disposed within first section 16 in a direction that is generally perpendicular to the longitudinal axis 104 of pivot member 22. The adjustable fastener 20 is preferably configured to allow the vertical position of pivot member 22 to be varied within slot pair 18. The head of adjustment screw 20 is preferably accessible via a hole in the top of first section 16 and configured to rotate with respect to the housing without advancing axially. This can be achieved by a number of known means such as the use of a Belleville washer which axially biases the head of adjustment screw 20 with respect to housing 14. To allow it to move the pivot member 22 vertically, adjustment screw 20 preferably has a threaded end which more preferably engages a complementary internally threaded hole in pivot member 22. Thus, according to this embodiment, as the adjustment screw 20 is rotated, it causes pivot member 22 to displace axially within slot pair 18.

As can be seen in FIGS. 1 and 2, by adjusting the vertical position of pivot member 22 in housing first section 16, the range of travel of lever 41 (i.e., the range of movement of lever 41 with respect to handlebar 12) may be adjusted. When pivot member 22 is in the position shown in FIG. 1, lever 41 operates within a minimum range of travel. However, when pivot member 22 is at the bottom of slot pair 18, lever 41 operates within a maximum range of travel.

Housing 14 also preferably includes second section 26 which houses a preferred embodiment of a master cylinder assembly 30 (not shown in FIGS. 1-2). As with first section 16, second section 26 includes a pair of aligned slots 28 on opposite sides of housing 14 (shown as 28a and 28b in FIGS. 3-5). The forked portion of lever proximal end 47 includes a pair of spaced apart and aligned apertures which are aligned with slot pair 28. The apertures and slot pair 28 both receive a actuating member 38. The engagement of actuating member 38 with slot pair 28 and the lever apertures aids in retaining lever 41 within housing 14 and actuating master piston assembly, as described below. In addition, a fastener 40, such as a screw or bolt, is preferably provided to aid in connecting actuating member 38 to master cylinder assembly 30.

Figure 3:
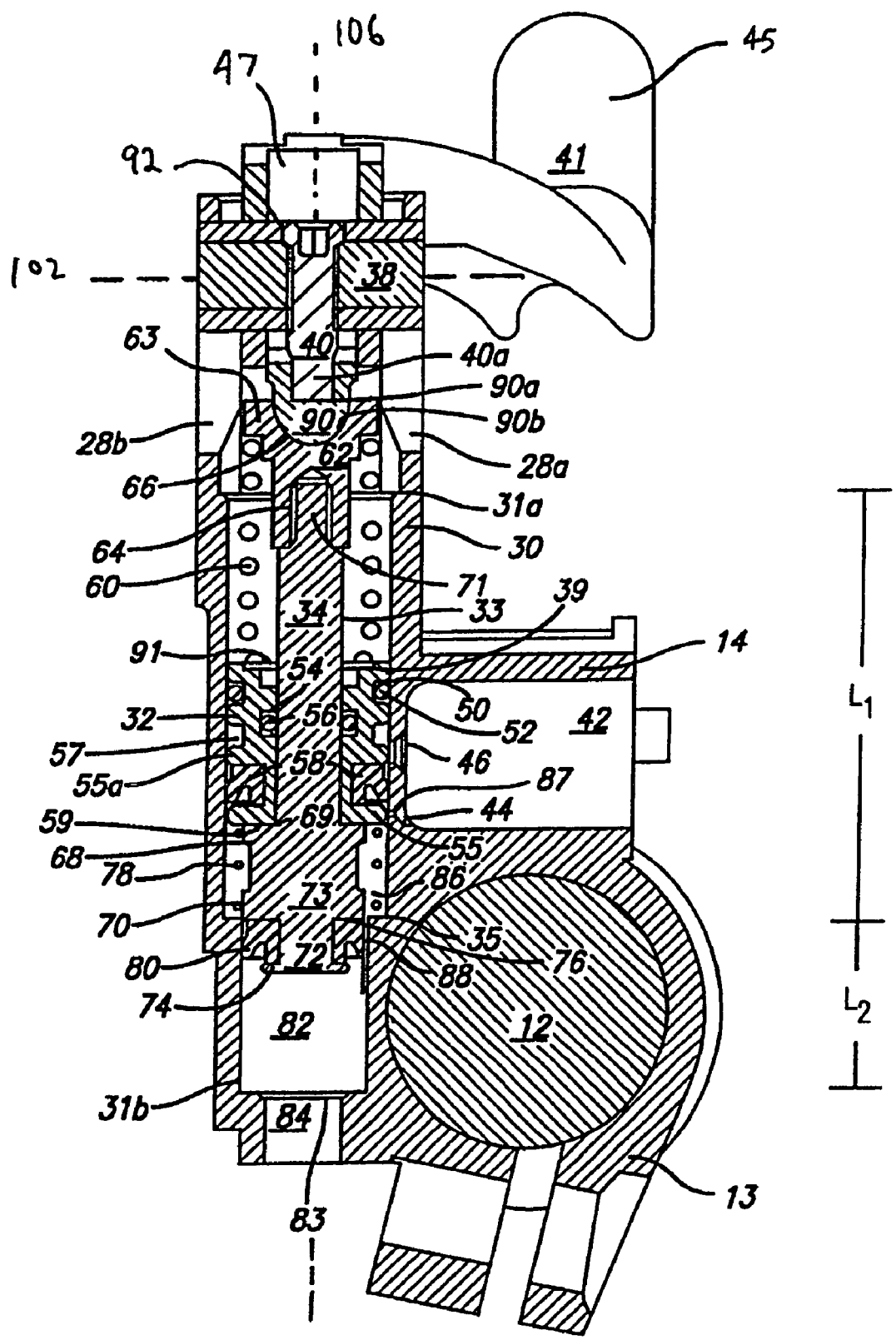
FIG. 3 is a cross-sectional view of the hydraulic disc brake lever assembly of FIG. 1 taken along line III-III with the lever in a neutral position.
Figure 4:
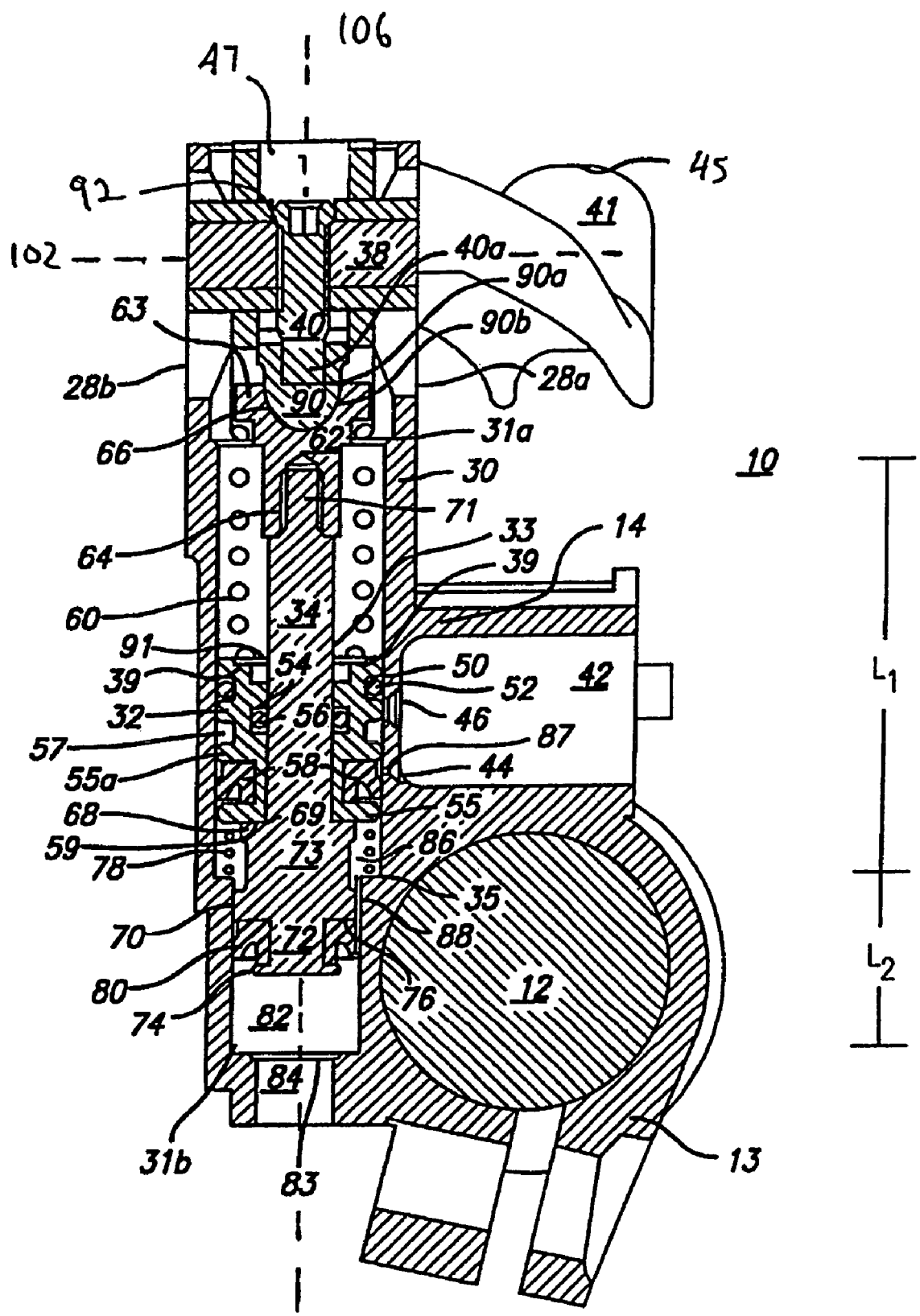
FIG. 4 is a cross-sectional view of the hydraulic disc brake lever assembly of FIG. 3 with the lever in a first actuating position.
Figure 5:
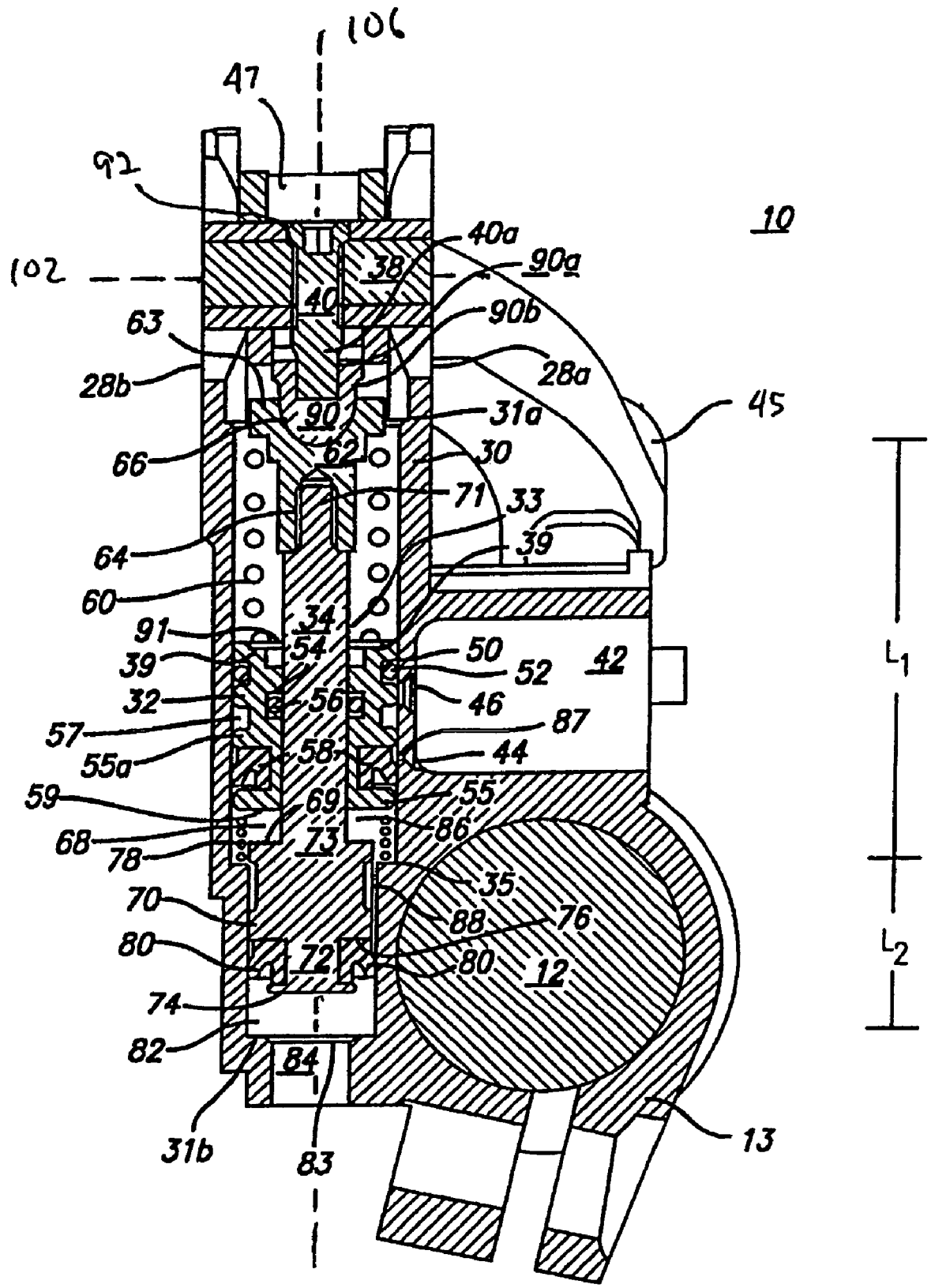
FIG. 5 is a cross-sectional view of the hydraulic disc brake lever assembly of FIG. 4 with the lever in a second actuating position.

FIGS. 3-5 show a cross-sectional view of a preferred embodiment of the brake lever assembly 10 of the present invention. The cross-sectional views of FIGS. 3-5 are taken along line III-III in FIG. 1. The three different views of FIGS. 3-5 represent different positions of lever 41 with respect to housing 14 and handlebar 12. FIG. 3 depicts lever 41 in a netural or non-actuating position. FIG. 4 depicts lever 41 in a first actuating position, and FIG. 5 depicts lever 41 in a second actuating position.

As will be described below, the movement of lever 41 from the neutral position to the first and second actuating positions is preferably used to force hydraulic fluid from brake lever assembly 10 to a hydraulic disc brake system. The present invention may be used with a number of different systems, including bicycle hydraulic disc brake systems such as those described in U.S. Pat. No. 6,491,144 (the "'144 patent"), the entirety of which is incorporated herein by reference. However, the present invention is not limited to any particular hydraulic system or hydraulic disc brake system. Thus, the disclosure of the '144 patent is referenced herein to illustrate a preferred embodiment of the present invention only. As shown in FIG. 16 of the '144 patent, hydraulic disc brake systems typically comprise a caliper housing and one or more slave pistons which are movable in response to changes in hydraulic fluid pressure applied via hydraulic fluid conduits in the caliper housing. As is also shown, the slave pistons typically include a friction member, such as a brake pad.

FIG. 16 of the '144 patent shows such a hydraulic disc brake system in use on a bicycle. As indicated, in bicycle applications the caliper housing is typically placed proximate a bicycle rotor which is mounted on and rotates with a front or rear wheel of the bicycle. The brake pads are typically positioned on opposite sides of the rotor. When braking is desired, hydraulic pressure is applied to the slave pistons to force the friction members to contact the rotor. The frictional resistance of the friction members against the rotor causes the bicycle wheel to rotate more slowly and eventually to stop rotating.

In a preferred embodiment of the present invention, a master cylinder assembly 30 is provided which is connected to a bicycle hydraulic disc brake system. Master cylinder assembly 30 preferably provides for mutli-stage braking, which more preferably is two-stage or dual-stage braking. In an especially preferred embodiment, during the first stage of braking, lever 41 is pulled through a first region of its range of travel, such that the master cylinder assembly causes the friction member or brake pad to come into contact with the rotor. This first region generally comprises from about 30 percent to about 70 percent of the lever's total range of travel, preferably comprises from about 40 percent to about 60 percent of the total range of travel and more preferably comprises from about 45 percent to about 55 percent of the total range of travel.

In the second stage of braking, lever 41 is pulled through a second region of its range of travel, causing the friction members to provide increasing amounts of pressure and frictional resistance to the rotor.

A preferred embodiment of a master cylinder assembly 30 shown in FIGS. 3-5 will now be described. Second housing section 26 includes a master cylinder 31 which is generally a cylindrical space defined in housing 14 having a top end 31*a* and a bottom end 31*b*. In an especially preferred embodiment, master cylinder 31 comprises two lengthwise regions, L1 and L2, wherein the L1 region has a diameter and a cross-sectional area that is greater than in the L2 region. The use of a master cylinder with two different diameters facilitates the creation of two hydraulic fluid containing regions, and consequently, the ability to provide two-stage braking as will be evident from the embodiments described below.

Master cylinder 31 houses a master piston assembly 33 which comprises first piston 32 and a second piston 34. In a preferred embodiment, first piston 32 is operatively connected to second piston 34, preferably via a longitudinal opening in which a portion of second piston 34 is concentrically disposed.

To operatively connect lever 41 to master piston assembly 33, one or more coupling members are preferably provided. A variety of different coupling member configurations and geometries may be used, and those shown in FIGS. 3-5 are merely preferred. In the embodiment of FIGS. 3-5, male-female coupling member 90 connects fastener 40 to dual female coupling member 62. Female portion 90*a* of male-female coupling member 90 is preferably sized to provide a tight fit with fastener 40 using known means. For example, fastener 40 may have an externally threaded end 40*a* which threadably engages a complementary set of internal threads formed on the internal surface of the female portion 90*a*. In addition, fastener 40 may be connected to male-female coupling member 90 by other means such as welding or gluing.

Male end 90*b* of male-female coupling member 90 is preferably connected to a wide connection 66 on dual female coupling member 62 by known attachment methods. In a preferred embodiment, male end 90*b* is press-fit into wide connection 66 of dual female coupling member 62. However, as explained further below, in other preferred embodiments male end 90*b* abuttingly engages wide connection 66 without being rigidly attached to it.

Dual female connector 62 also preferably includes a narrow connection portion 64 which receives an upper end 71 of second piston 34. It is preferred that narrow connection portion 64 is internally threaded to engage complementary threads which are formed on upper end 71 of second piston 34. Thus, in the preferred embodiment of FIGS. 3-5, lever 41 is operatively connected to second piston 34 via actuating member 38, fastener 40, male-female coupling member 90 and dual female coupling member 62. As a result, the pivotal movement of lever 41 about pivot member 22 causes second piston 34 to move along the axial direction of master cylinder 31.

As indicated in FIGS. 3-5, a first fluid containing region 82 is defined within master cylinder 31 proximate its bottom end 31*b*. As second piston 34 is moved due to the pivotal movement of lever 41, fluid in first fluid containing area 82 is displaced through exit port 83 into hydraulic conduit attachment 84. Hydraulic conduit attachment 84 is preferably designed to be attachable to a hydraulic conduit such as a hose which may then be connected to a disc brake caliper. If the brake lever assembly 10 is connected to a disc brake assembly such as the one depicted in FIG. 16 of the '144 patent, the displacement of hydraulic fluid into such a hydraulic conduit causes fluid to move into the fluid conduits of the caliper housing (e.g., conduits 37 in FIG. 16 of the '144 patent).

As mentioned earlier, the present invention preferably provides for two-stage braking when brake lever assembly 10 is connected to a hydraulic disc brake assembly. In the embodiments of FIGS. 1-5, this two-stage braking is facilitated by the operative connection of first piston 32 and second piston 34.

Referring to FIG. 3, first piston 32 is generally annular in shape, preferably having an opening, more preferably a through-hole 51, running along its longitudinal axis. First piston 32 is preferably sized to closely fit within master cylinder 31 while still being movable with respect to it.

In the preferred embodiment of FIGS. 3-5, a portion of second piston 34 is disposed in through-hole 51. Through-hole 51 is preferably sized to create a relatively close fit with the outer surface of second piston 34, while allowing second piston 34 to move within through-hole 51 in the manner described below. Second piston 34 also projects through flat sealing member 91 at the top end of first piston 32. Flat sealing member 91 is preferably a gasket and is included to aid in sealing master piston assembly 33 from an upper portion of master cylinder 31 lying above the outer piston, thereby reducing the likelihood that hydraulic fluid will leak from housing 14. As shown in the figures, first piston 32 includes a radially inward lip 39 against which flat sealing member 91 is seated to aid in holding flat sealing member 91 in place.

First piston 32 preferably has a first circumferential groove 50 around its outer circumference. An o-ring seal 52 or other suitable means preferably provides a seal between first piston 32 and master cylinder 31 while allowing first piston 32 to move within master cylinder 31. First piston 32 also preferably includes a second circumferential groove 54 around the inner surface defined by through-hole 51. O-ring 56 is provided to aid in maintaining a seal between the two pistons, 32 and 34, while allowing second piston 34 to move with respect to first piston 32. In addition, open circumferential groove 57 is preferably provided around the outer surface of first piston 32 to reduce the amount of friction between first piston 32 and master cylinder 31. First piston 32 also preferably includes a lower flange 55 and an opposing middle flange 55*a* which along with master cylinder 31 define an annular space around the lower portion of first piston 32. A seal 58, which is preferably a cup seal or umbrella seal, is snugly fit into the annular space.

Second piston 34 includes a lower end 73 having an upper flange 68 a middle flange 70 and a lower neck 72. Lower neck 72 includes a fluid contacting flange 74 which is in contact with hydraulic fluid in first fluid containing area 82. Middle flange 70 includes bottom surface 76. It is preferred that middle flange 70 have an outer diameter that is greater than that of lower neck 72 and fluid contacting flange 74, thereby creating an annular space defined by master cylinder 31, lower neck 72, middle flange 70 and fluid contacting flange 74. A seal 80, which is preferably a cup seal or an umbrella seal, is disposed within this annular space.

Referring again to FIG. 3, second piston upper flange 68 preferably includes a first piston contacting surface 69. When lever 41 is in the neutral position, first piston contacting surface 69 abuts a complementary second piston contacting surface 59 on outer piston lower flange 55. In addition upper flange 68 and middle flange 70 of second piston 34 preferably have smaller diameters than the L1 portion of master cylinder 31, as does the portion of lower end 73 lying between flanges 68 and 70. The relative difference facilitates the creation of a second fluid containing region 86. As shown in FIGS. 3-5, second fluid containing region 86 is an annular space that is preferably located above first fluid containing region 82. It is especially preferred that the second fluid containing region 86 have a cross-sectional area (i.e., an area perpendicular to the lengthwise axis of master cylinder 31) that is less than the cross-sectional area of first fluid containing region 82.

Second fluid containing region 86 preferably includes a biasing device such as a spring 78 for biasing first piston 32 away from master cylinder bottom end 31b. As the figures indicate, the master cylinder's change in diameter from region L1 to region L2 creates a radially inward projecting lip 35. Spring 78 preferably concentrically surrounds second piston 34 such that one end abuts lip 35 and the other end abuts first piston lower flange 55. Because housing 14 remains fixed relative to handlebar 12, lip 35 remains fixed, allowing spring 78 to bias first piston 32 away from master cylinder bottom end 31b.

The embodiment of FIGS. 3-5 also preferably includes a biasing device such as a spring 60 for biasing first piston 32 away from dual female coupling member 62. Spring 60 is preferably concentrically positioned about dual female coupling member 62 and second piston 34. In a preferred embodiment, dual female coupling member 62 includes outer flange 63. One end of spring 60 is seated against the bottom surface of outer flange 63. As mentioned above, flat sealing member 91 is preferably concentrically positioned around second piston 34 and seated against radially inward projecting lip 39 of first piston 32. The end of spring 60 that is opposite dual female coupling member 62 is preferably seated against flat sealing member 91 or the area of first piston 32 adjacent to it. As a result, spring 60 preferably biases first piston 32 away from dual female coupling member 62. Thus, as lever 41 is moved towards handlebar 12, actuating member 38 is displaced towards master cylinder bottom end 31b. Because fastener 40 is connected to actuating member 38, the two components move together. As fastener 40 moves, male-female coupling member 90 and dual female coupling member 62 move with it. Because of the engagement of spring 60 with dual female coupling member 90 and flat sealing member 91 (or the adjacent portion of first piston 32), first piston 32 begins to move towards master cylinder bottom end 31b as lever 41 is moved from the neutral position of FIG. 3 to the first actuating position of FIG. 4.

Figure 6:
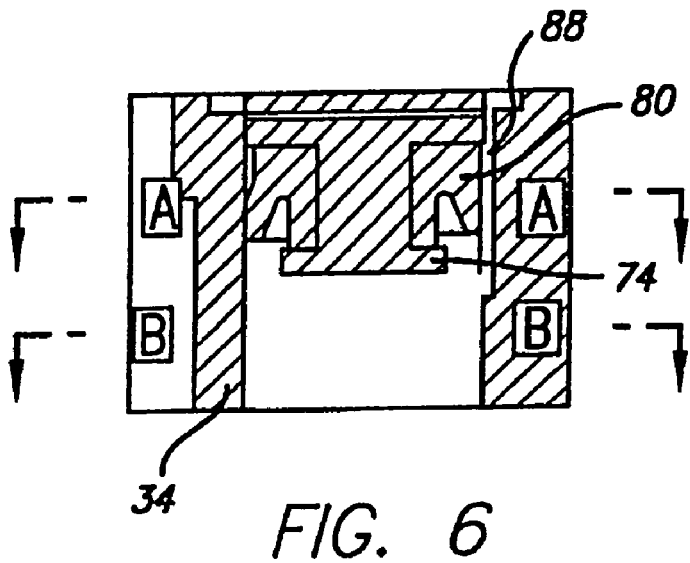
FIG. 6 is an detail view of a portion of FIG. 3.
Figure 7:
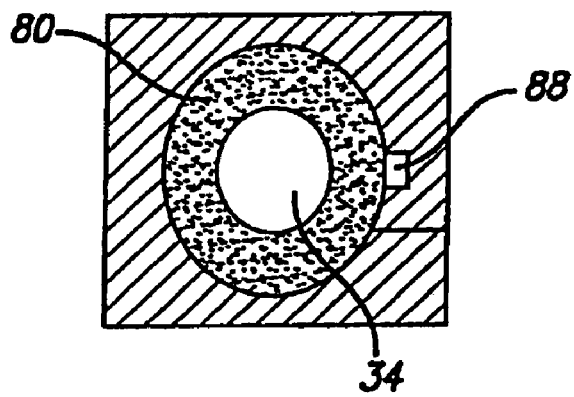
FIG. 7 is a cross-sectional view of FIG. 6 taken along the line A-A in FIG. 6.
Figure 8:
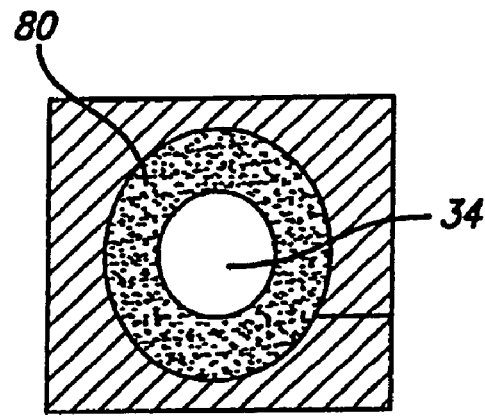
FIG. 8 is a cross-sectional view of FIG. 7 taken along the line B-B in FIG. 6.
Figure 9:
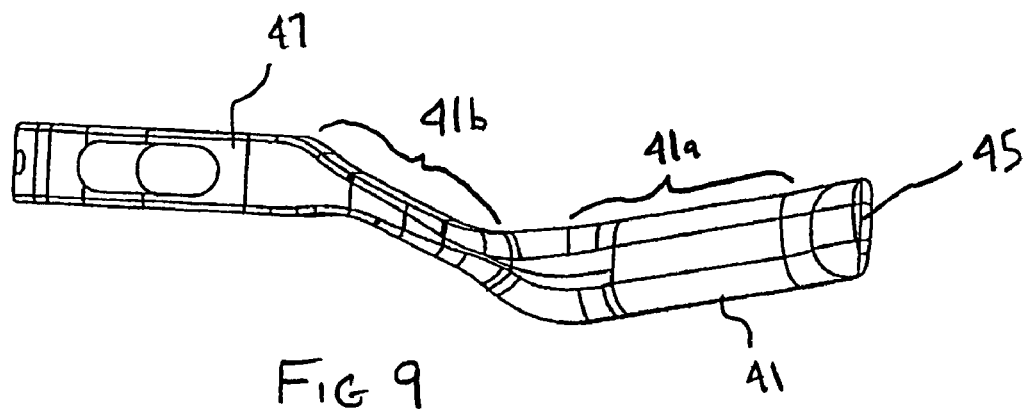
FIG. 9 is a front elevational view of the brake lever of FIG. 1.
Figure 10:
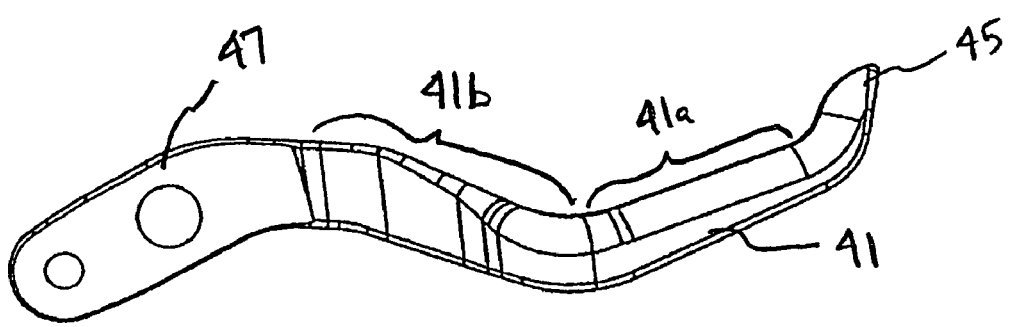
FIG. 10 is a top plan view of the brake lever of FIG. 1.
Figure 11:
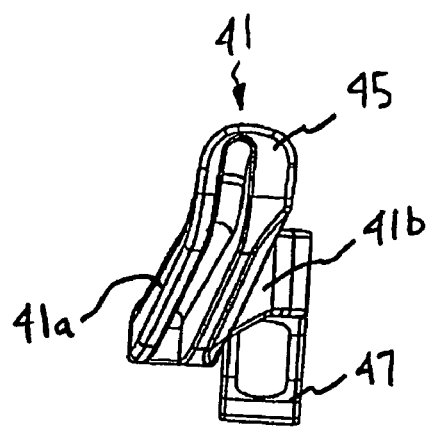
FIG. 11 is an end view of the brake lever of FIG. 1.

It is preferred that housing 14 include a hydraulic fluid reservoir 42 for storing hydraulic fluid. Two ports, a timing port 44 and a compensating port 46 are preferably provided to allow hydraulic fluid to flow between reservoir 42 and master cylinder 31. As best shown in FIGS. 3-5, first fluid passage 87 connects reservoir 42 to second fluid containing area 86. As best shown in FIGS. 6-8, a second fluid passage 88 connects second fluid containing area 86 and first fluid containing area 82. Thus, when lever 41 is in the neutral position as shown in FIG. 3, timing port 44 is in fluid communication with first fluid containing area 82 and fluid conduit attachment 84 via first fluid passage 87, second fluid containing area 86 and second fluid passage 88.

If a hydraulic disc brake is attached to lever assembly 10, when lever 41 is in the neutral position of FIG. 3 or farther away from handlebar 12, the total liquid volume of the hydraulic brake system will include the volume of reservoir 42. As a result, the pressure at second fluid containing area and hydraulic fluid conduit 84 will be relatively low. However, as lever 41 is moved to the first actuating position shown in FIG. 4, the operative connection between lever 41, and first piston 32 causes first piston 32 and seal 58 to move towards master cylinder bottom end 31b. When seal 58 reaches timing port 44, first fluid passage 87 is substantially isolated from timing port 44 and reservoir 42. At this point, the overall hydraulic system volume which is available for actuating the brake system is reduced, and the system pressure begins to correspondingly increase. If the attached disc brake's fluid conduits are already liquid full, further movement will move the slave piston(s) and the attached brake pads, towards the rotor.

As indicated above, first and second pistons 32 and 34 preferably move together when lever 41 is between the neutral and first acutating positions. To facilitate this movement, spring 60 is preferably selected such that it applies greater force to outer piston 32 than does second spring 78 as lever 41 is moved from the neutral position to the first actuating position. It is especially preferred that spring 60 have a spring constant or stiffness that is greater than spring 78, wherein the stiffness or spring constant is defined by the relationship k=F/x, with F being equal to the force required to linearly compress the spring a distance x. As a result of the differential spring strengths, as lever 41 is moved from the neutral position of FIG. 3 to the first actuating position of FIG. 4, second piston engagement surface 59 of first piston flange 55 will abuttingly engage first piston engaging surface 69 of second piston 32, causing first piston 32 to move towards master cylinder bottom end 31b along with second piston 34. Accordingly, fluid will be displaced from second fluid containing region 86 to first fluid containing region 82 via second fluid passage 88 and from first fluid containing region 82 to hydraulic fluid conduit attachment 84 via exit port or fluid outlet 83.

As will be apparent to those of ordinary skill in the art, as lever 41 is moved from the neutral position of FIG. 3 to the first actuating position of FIG. 4, the volume of hydraulic fluid displaced to the exit port or fluid outlet 83 of master cylinder 31 will equal the sum of the volumes of fluid displaced from the first and second fluid containing regions 82 and 86. In a preferred embodiment, as lever 41 is moved from the neutral position to the first actuating position, at least one of the friction members or brake pads of an attached disc brake system will move from a position in which it does not contact the rotor to one in which it contacts the rotor. It is especially preferred that once the first actuating position of FIG. 4 is reached, the brake pad will have just come into contact with the rotor without applying appreciable pressure to it. One skilled in the art will readily appreciate how to select the dimensions of master cylinder 31, pistons 32 and 34, hydraulic conduit 84 and the disc brake caliper components to obtain a brake lever and brake system in which the brake pad contacts the rotor without applying appreciable pressure once lever 41 reaches the first actuating position.

As indicated in FIG. 4, once lever 41 reaches the first actuating position, first piston 32 will be at a threshold distance from the master cylinder top end 31a at which seal 80 will preferably close off the outlet of second fluid passage 88. Closure of the outlet of second fluid passage 88 will substantially isolate first fluid containing region 82 from second fluid containing region 86. As a result, negligible or no hydraulic fluid will enter or leave second fluid containing region 86. Because the volume of fluid in second fluid containing region 86 will be substantially fixed and because liquids such as known hydraulic fluids are substantially incompressible, second piston engagement surface 59 of first piston 32 will be biased away from first piston engagement surface 69 of second piston 34 and towards the top end 31a of master cylinder 31. As best shown in FIG. 5, at this point, further movement of lever 41 towards handlebar 12 will cause second piston 34 to separate from first piston 32, such that second piston 34 moves towards master cylinder bottom end 31b, while first piston 32 remains substantially stationary. Thus, the distance from master cylinder top end 31a to the outlet of second fluid passage 88 effectively defines a first movement region along the length of master cylinder 31, such that when master piston assembly 33 is within the first movement region, first piston 32 and second piston 34 move together. However, once second piston 34 begins to exit the first movement region and is at least partially outside of it, second piston 34 moves with respect to first piston 32.

If brake lever assembly 10 is attached to a hydraulic disc brake, once the brake pads contact the rotor, the volume of liquid which can be displaced from master cylinder 31 will be relatively small. Because typical hydraulic fluids are substantially incompressible, further movement of inner piston 34 towards master cylinder bottom end 31b will increase the system hydraulic pressure and the frictional force applied to the rotor. However, some liquid will be displaced from master cylinder 31 even after the brake pads contact the rotor due to a variety of factors such as the compressibility of the brake pads, the expansion or extension of the hydraulic conduit, which is typically a flexible hose, or due to system leakage.

A preferred embodiment of a method of using a hydraulic disc brake lever assembly 10 made in accordance with the foregoing embodiments will now be described. In accordance with the method, a bicycle is provided having a rotor on its front or back wheel. A hydraulic disc brake caliper, for example the caliper of FIG. 16 in the '144 patent, is attached to the wheel to which the rotor is attached such that its brake pads are positioned on either side of the rotor.

In accordance with the method, the bicycle is provided with a hydraulic disc brake lever assembly 10 attached to a handlebar 12. At some point when the bicyclist is riding the bicycle, he or she will want to slow or stop the bicycle by applying the brakes. At that time, the rider will grip handlebar 12 and will also grip lever 41 in relatively flat region 41a. As indicated earlier, handlebar 41 is preferably configured to restrict the rider's lateral movement of his or her hand along the length of the lever 41. The rider will then contract lever 41 towards handlebar 12 at a substantially constant rate of speed. Due to the operative connection of lever 41 and master piston assembly 33, first piston 32 and second piston 34 will begin to move towards bottom end 31b of master cylinder 31 while remaining within the first movement region defined by the master cylinder top end 31a and the outlet of fluid passage 88. During this motion of lever 41, hydraulic fluid will be displaced from second fluid containing region 86 into first fluid containing region 82 and from first fluid containing region 82 to hydraulic conduit attachment 84. As a result, hydraulic fluid will begin to fill the hydraulic fluid conduits within the caliper housing (unless the caliper housing conduits are already liquid full). Once the conduits are full of hydraulic fluid, pressure will be applied to the disc brake slave pistons, moving them towards the rotor. During this time, no braking will occur.

The rider will preferably continue to contract lever 41 at the same substantially constant rate of speed. As he or she continues to do so, lever 41 will reach a first actuating position (see FIG. 4), at which time first piston 32 will preferably reach a threshold distance from master cylinder top end 31a. Cup seal 80 will then preferably close off the outlet of second fluid passage 88 from second fluid containing region 86. At this point, the volume of fluid contained in second fluid containing region 86 will be substantially fixed, and as a result, the fluid will begin to bias first piston 32 towards master cylinder top end 31a. Thus, further movement of lever 41 towards handlebar 12 will cause second piston 34 to separate from first piston 32 and move towards master cylinder bottom end 31b as it exits the first movement region of master cylinder 31 (see FIG. 5). However, first piston 32 will remain substantially stationary. Also, once lever 41 reaches its first actuating position, the brake pads will preferably make contact the rotor without applying appreciable pressure to it. A first volume of hydraulic fluid, V1, will be displaced during this first movement of lever 41 from the neutral position to the first actuating position.

The rider will preferably continue to contract lever 41 from the first actuating position to the second actuating position at the same rate of speed used to contract the lever from the neutral position to the first actuating position. At this point, because the brake pads are in contact with the rotor, the system pressure will begin to rise and the frictional resistance applied by the brake pads to the rotor will increase. Because second fluid containing region 86 will be substantially isolated from first fluid containing region 82, the total volume of hydraulic fluid delivered from lever assembly 10 to the disc brake caliper housing, as lever 41 is moved from the first actuating position to the second actuating position, V2, will be less than V1. Thus, according to the preferred embodiment of this method, a larger amount of fluid is delivered in the first region of travel of brake lever 41 than in a second region of travel. In an especially preferred embodiment, the method will provide two-stage braking in which the ratio of fluid volume displaced from master cylinder assembly 31 to lever travel will vary as lever 41 is contracted towards handlebar 12. As those skilled in the art will appreciate, for a given displacement of lever 41 within the first region of its range of travel, a greater volume of hydraulic fluid will be discharged from master cylinder assembly 31 than when lever 41 is displaced the same distance within the second region.

As mentioned earlier, in known hydraulic brake assemblies there is typically a "dead band" as the rider begins to contract the lever during which no braking occurs. As used herein, the term "dead band" means the distance between the seal of a master piston and a hydraulic fluid reservoir port when the master piston is in its non-actuated or rest state.

As explained earlier with respect to the preferred embodiment of FIG. 3, when lever 42 is in its neutral position, first piston 32 and second piston 34 are in their non-actuated states and timing port 44 is in fluid communication with first fluid containing area 86 and fluid conduit attachment 84. When first piston 32 is in its non-actuated state, the dead band is the distance between seal 58 and timing port 44, as measured along the lengthwise direction of master cylinder 31.

In accordance with a preferred embodiment of the present invention, master cylinder assembly 30 has an adjustable dead band. The adjustable dead band preferably allows users to compensate for system hydraulic changes (e.g., changes in the shape or effective length of hydraulic fluid conduit 84 or in the attached brake system) to maintain a consistent braking feel and operation.

Even more preferably, the dead band of master cylinder assembly 30 is adjustable without affecting the reach or neutral position of lever 41. As used herein, the term "reach" refers to the range of travel between the neutral and fully actuated positions of lever 41.

In the preferred embodiment of FIGS. 1-8, users may adjust the dead band by adjusting fastener 40. The dead band is adjustable within a range that is generally from about 2.0 to about 3.0 mm, preferably from about 2.2 to about 2.8 mm, and more preferably from about 2.4 to about 2.6 mm. Fastener 40 is preferably adjustable using conventional tools such as a screw driver or Allen wrench. Fastener 40 is also preferably externally threaded to engage complementary threads formed in through-hole 92 of actuating member 38. As a result of this threaded engagement, rotation of fastener 40 causes it to move with respect to actuating member 38 along the lengthwise direction of master cylinder 31.

In accordance with this preferred embodiment, fastener 40 is secured to male-female coupling member 90 by known means, such as threaded engagement, welding, gluing, or a snap-fit connection. Male end 90b of male-female coupling member 90 preferably abuttingly engages wide end 66 of dual female connector 62 without being rigidly attached to it. To provide a more stable connection, a post, setting boss or other protrusion may be included on male end 90b which engages a complementary hole formed in wide end 66 of dual-female coupling member 62.

The engagement of male-female coupling member 90 and dual female connector 62 preferably allows male-female coupling member 90 to rotate with respect to dual female coupling member 62. As a user rotatably adjusts fastener 40, it moves along the lengthwise direction of master cylinder 31 and with respect to actuating member 38. The adjustment of fastener 40 also causes male-female coupling member 90 to rotate and move in the lengthwise direction of master cylinder 31 with fastener 40. To better facilitate this axial movement, forked proximal end 47 of lever 41 is preferably sized to receive male-female coupling member 90.

In FIGS. 3-5, fastener 40 is fully-seated in cross-member through-hole 92. As a result, the dead band of master cylinder assembly 30 is at a minimum. As fastener 40 is rotated in a first direction, it will move with respect to actuating member 38 and away from master cylinder bottom end 31b. Male-female coupling member 90 will also rotate and move with actuating member 38. As male-female coupling member 90 moves away from master cylinder bottom end 31b, it will initially separate from dual-female coupling member 62. However, the biasing action of springs 60 and 78 will move first piston 32 and second piston 34 away from master cylinder bottom end 31b until wide end 66 of dual female coupling member 62 again abuttingly engages male end 90b of male-female coupling member 90. As a result, the rest or non-actuating state of first piston 32 will change, thereby moving seal 58 away from timing port 44 and increasing the dead band of master cylinder assembly 30.

If the dead band is not at its minimum (i.e., fastener 40 is not fully-seated in cross-member through-hole 92) the dead band may be decreased by the user. To decrease the dead band, fastener 40 is preferably rotated in a second direction, which is opposite the first direction referenced above. As fastener 40 is rotated in the second direction, it will move with respect to actuating member 38 towards master cylinder bottom end 31b. As a result, male-female coupling member 90 will also move toward bottom end 31b. As male-female coupling member 90 moves towards bottom end 31b, it will force dual female coupling member 62 in the same direction, thereby compressing spring 78 and changing the non-actuated state of first piston 32. As a result, the distance between seal 58 and timing port 44 will decrease, thereby decreasing the dead band.

It is especially preferred that the dead band of master cylinder assembly 30 is adjustable without affecting the lever's reach. Referring to FIG. 3, lever 41 is in a neutral position and first piston 32 is in a non-actuated state. As lever 41 is actuated, it will eventually reach a fully-actuated position at which no further actuation is possible.

The design of various components in brake lever assembly 10 may limit the fully-actuated position of lever 41. However, to better ensure that adjustments to the dead band do not affect the lever's reach, the fully-actuated position of lever 41 is preferably not limited by the abutment of second piston fluid contacting flange 74 and master cylinder bottom end 31b. Instead, it is preferred to use other components of brake lever assembly 10 to limit the lever's fully-actuated position, as described below.

For example, depending on their length, slots 28a and 28b may be used to limit the fully-actuated position of lever 41. As lever 41 is contracted towards handlebar 12, actuating member 38 will move along slot pair 28 until it reaches the bottom of slots 28a and 28b. At this point, no further actuation will be possible.

In addition, the brake lever assembly 10 may be configured such that the abutment of lever 41 and handlebar 12 limits the lever's fully actuated position. Housing second section 26 and/or clamp 13 may be sized to ensure that lever 41 abuttingly engages handlebar 12 before actuating member 38 reaches the bottom of slot pair 28 and before flange 72 of second piston 34 reaches master cylinder bottom end 31b. This configuration will also prevent changes in dead band from affecting changes in the reach of lever 41.

Brake lever assembly 10 also preferably includes reach adjustment. Even more preferably, the reach is adjustable without affecting the dead band. In the preferred embodiment of FIGS. 1-8, the neutral position of lever 41 may be adjusted to vary the lever's reach without affecting the dead band.

As described previously, the vertical position of pivot member 22 in housing first section 16 may be adjusted to vary the lever's neutral position. To adjust the neutral position, a user rotates adjustable fastener 20, thereby moving pivot member 22 within slot pair 18. Because of the biasing action of springs 60 and 78, as pivot member 22 moves along slot pair 18, actuating member 38 will remain biased against the top of slot pair 28. As a result, lever 41 will pivot about the longitudinal axis 102 of actuating member 38 until further adjustment of pivot member 22 stops. Because the position of actuating member 38 with respect to slot pair 28 is unchanged by this operation, the dead band of master cylinder assembly 30 will be substantially unaffected by the adjustment of the lever's reach.

In accordance with the preferred embodiment of FIGS. 1-8, the reach of lever 41 is adjusted by pivoting lever 41 about a lever region (i.e., the region of lever 41 lying between slots 28a and 28b) that is spaced apart from the longitudinal axis of pivot member 22 and which is substantially aligned with master cylinder 31. More preferably, lever 41 is pivoted about the longitudinal axis 102 of actuating member 38 to adjust the reach. As indicated in FIGS. 1-2, it is especially preferred that the longitudinal axis 102 is substantially parallel to longitudinal axis 104 and also substantially perpendicular to the longitudinal axis 106 of master cylinder 31.

This preferred embodiment allows the user to adjust the reach of lever 41 without affecting the dead band of master cylinder assembly 30, and conversely, to adjust the dead band of master cylinder assembly 30 without affecting the reach of lever 41. It also provides a lever 41 which is pivotable about a first axis (longitudinal axis 104 of pivot member 22) to actuate first piston 32 and second piston 34 and about a second axis (longitudinal axis 102 of actuating member 38) to adjust the lever's reach.

The reach and dead band adjustment features of this preferred embodiment have been described in the context of a dual-piston master cylinder assembly. However, it should be understood that a dual piston configuration is not required to provide the reach and dead band adjustment features described herein. For example, if first piston 32 and second piston 34 were instead replaced with a single piston, spring 60 could be eliminated. Spring 78 could also be configured to bias the single piston away from master cylinder bottom end 31*b*. In an exemplary embodiment, one end of spring 78 would abuttingly engage the master cylinder bottom end 31*b* while the other end would engage a bottom surface of the single piston. As with the dual piston embodiment, the axial movement of fastener 40 with respect to actuating member 38 would result in the movement of the non-actuated position of a seal formed on the single piston to adjust the dead band. Thus, lever 41 would be pivotable about longitudinal axis 104 of pivot member 22 to actuate the single piston and would also be pivotable about longitudinal axis 102 of actuating member 38 to adjust the neutral position, and hence the reach, of lever 41.

FIGS. 12-15 show another embodiment of the brake lever assembly 10. It will be understood that the embodiment shown in FIGS. 12-15 operates in the same way as the embodiment described above, but includes additional features, such as a finger shift mechanism.

Figure 12:
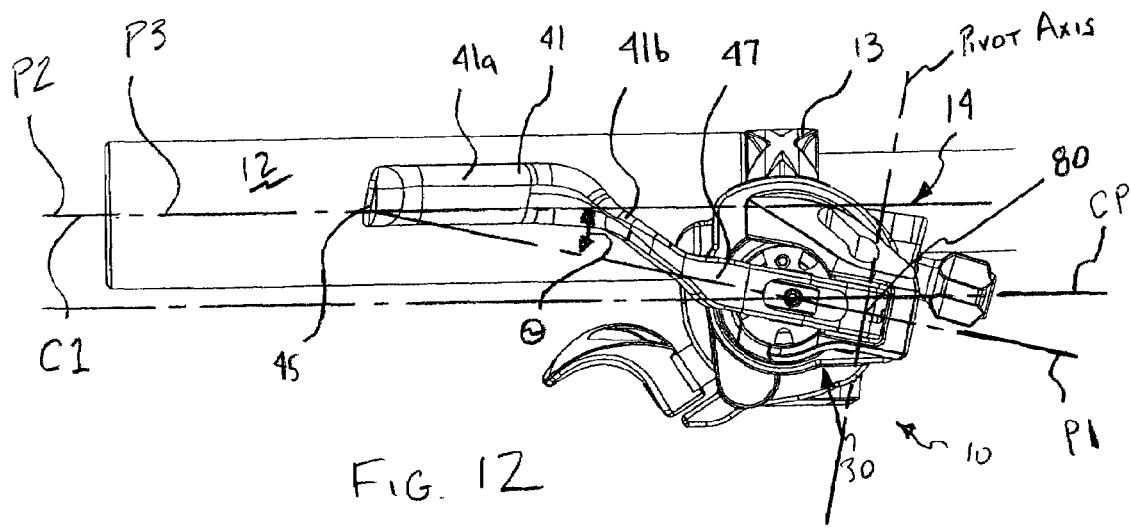
FIG. 12 is a front elevational view of a brake lever assembly and handlebar in accordance with another preferred embodiment of the present invention.

As is best shown in FIG. 12, handlebar 12 and clamp 13, which are preferably coaxial, each define a centerline C1. The point at which the proximal end 47 pivots about the pivot axis is referred to herein as the pivot point 80. As can be seen in FIGS. 2 and 12, in a preferred embodiment, the pivot point 80 is located below the centerline C1. In another embodiment, the pivot point 80 can be located above the centerline C1 (it will be understood that this would be a mirror image of what is presently shown in the figures).

In operation, when the brake lever 41 is rotated about its pivot axis, the proximal end 47 moves in a first plane P1 and the relatively flat region 41*a* moves in a second plane P2 that is coplanar with a third plane P3 defined by the centerline C1. The angle at which the sloping transition 41*b* extends from the proximal end 47 allows the proximal end 47 to be located below the substantially horizontal plane defined by the centerline C1 (third plane P3) and allows the relatively flat region 41*a* to be movable within that plane (second plane P2). The descriptive terms "second and third planes P2 and P3" are used herein for ease of understanding. However, it will be understood by those skilled in the art that second and third planes P2 and P3 are essentially the same plane.

As can be seen in FIG. 12, in a preferred embodiment, the proximal end 47 is oriented at an angle θ with the centerline C1. In other words, first plane P1 is oriented at angle θ with second and third planes P2 and P3. Preferably θ is between about 10° and about 45°. More preferably θ is between about 20° and about 35°.

Master cylinder assembly 30 defines a centerline C2, which defines a cylinder plane CP. As shown in FIG. 12, the cylinder plane CP, which includes pivot point 80, is located below and is not coplanar with the second and third planes P2 and P3.

Figure 13:
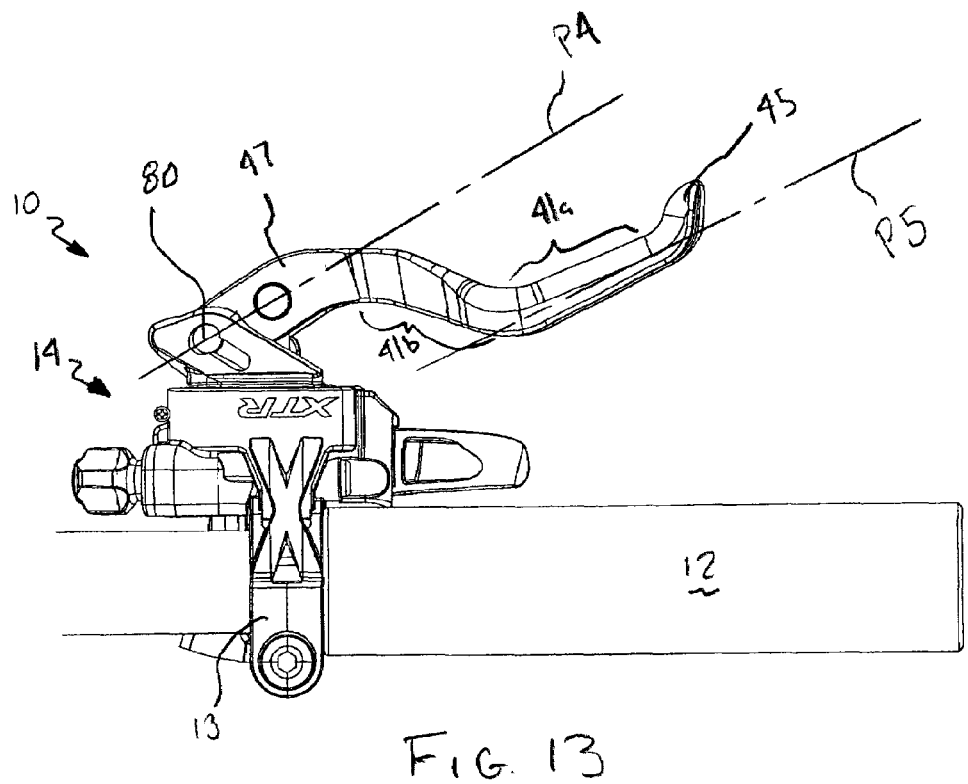
FIG. 13 is a top plan view of the brake lever assembly and handlebar of FIG. 12.
Figure 14:
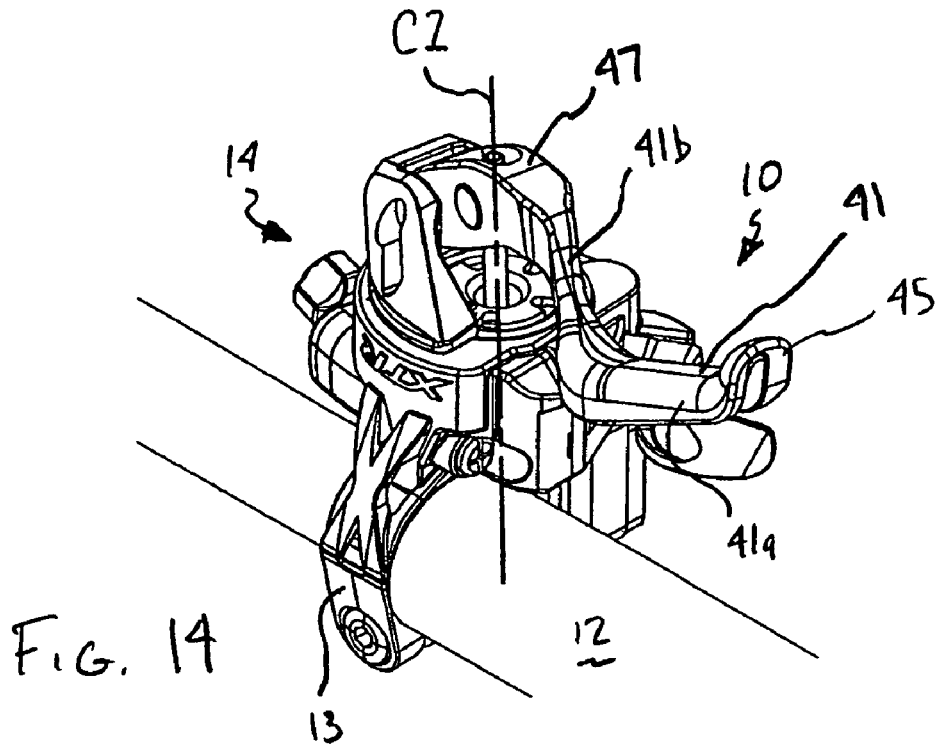
FIG. 14 is a perspective view of the brake lever assembly and handlebar of FIG. 12.
Figure 15:
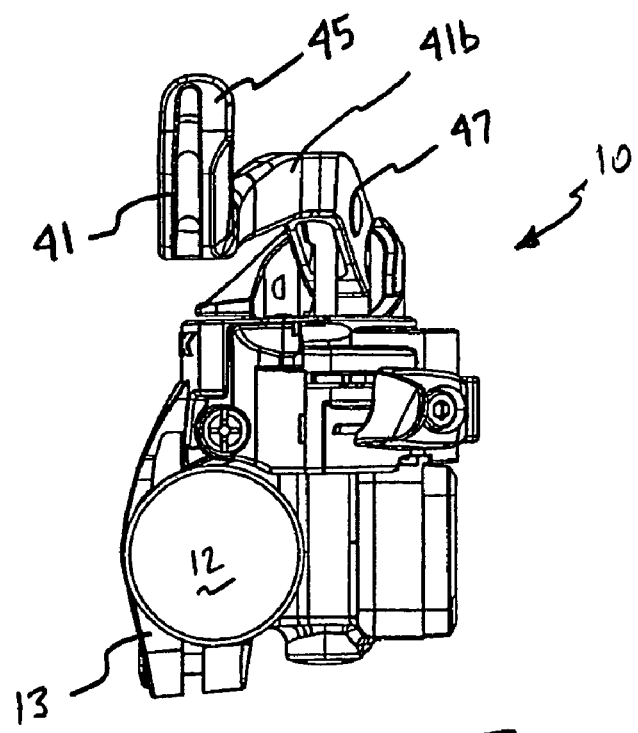
FIG. 15 is an end view of the brake lever assembly and handlebar (in cross section) of FIG. 12.

As can be seen in FIG. 13, the proximal end 47 defines a substantially vertical fourth plane P4 and the relatively flat region 41*a* defines a substantially vertical fifth plane P5. The two planes P4 and P5 are not coplanar.

The embodiments described above are exemplary embodiments of a the present invention. Those skilled in the art may now make numerous uses of, and departures from, the above-described embodiments without departing from the inventive concepts disclosed herein. Accordingly, the present invention is to be defined solely by the scope of the following claims.

What is claimed is:

1. A brake lever assembly comprising:
   a) a housing, and
   b) a brake lever pivotably secured to the housing at a pivot point,
      i) the brake lever including a proximal end that is rotatable about a pivot axis and is movable in a first plane when the brake lever rotates about the pivot axis,
      ii) the brake lever including a sloping transition that extends away from the proximal end at an angle, and
      iii) the brake lever including a substantially flat region that is movable in a second plane when the brake lever rotates about the pivot axis, wherein the first plane is oriented at an angle to the second plane, and wherein the sloping transition connects the substantially flat region to the proximal end.

2. The brake lever assembly of claim 1 wherein the angle between the first and second planes is between about 10° and about 45°.

3. The brake lever assembly of claim 1 wherein the housing includes a master cylinder assembly defining a centerline disposed therein, wherein the centerline of the master cylinder defines a cylinder plane, and wherein the cylinder plane and the second plane are not coplanar.

4. The brake lever assembly of claim 3 wherein the master cylinder includes a master piston operatively connected to the lever.

5. The brake lever assembly of claim 1 wherein the housing includes a clamp that defines an opening for receiving a handlebar, wherein the opening defines a centerline that defines a third plane.

6. The brake lever assembly of claim 5 wherein the second and third planes are substantially coplanar.

7. The brake lever assembly of claim 5 wherein the housing includes a master cylinder assembly defining a centerline disposed therein, wherein the centerline of the master cylinder defines a cylinder plane, and wherein the cylinder plane and the third plane are not coplanar.

8. The brake lever assembly of claim 5 wherein the pivot point is located below the centerline.

9. The brake lever assembly of claim 5 wherein the proximal end is positioned below the centerline.

10. The brake lever assembly of claim 1 wherein the angle between the first and second planes is between about 20° and about 35°.

11. A brake lever assembly comprising:
    a) a housing that includes a clamp that defines a centerline, wherein the centerline defines a first plane, and
    b) a brake lever pivotably secured to the housing at a pivot point, wherein the pivot point is located below the first plane,
       i) the brake lever including a proximal end that is rotatable about a pivot axis, wherein the proximal end is positioned below the first plane and defines a proximal end axis,
       ii) the brake lever including a sloping transition that extends away from the proximal end axis at an angle, and
       iii) the brake lever including a substantially flat region that is movable in a plane that is substantially parallel with the first plane when the proximal end rotates about the pivot axis, wherein the sloping transition connects the substantially flat region to the proximal end.

12. The brake lever assembly of claim 11, wherein the proximal end is movable in a second plane when the proximal end rotates about the pivot axis, wherein the second plane is oriented at an angle to the first plane.

13. The brake lever assembly of claim 12, wherein the angle between the first and second planes is between about 10° and about 45°.

14. The assembly of claim 12 wherein the angle between the first and second planes is between about 20° and about 35°.

15. The a brake lever assembly of claim 11, wherein the proximal end further defines a first vertical plane and the substantially flat region defines a second vertical plane, and wherein the first and second vertical planes are not coplanar.

16. The brake lever assembly of claim 11 further comprising a distal end that extends away from the substantially flat region at an angle.

17. The brake lever assembly of claim 11 wherein the housing includes a master cylinder assembly disposed therein.

18. The brake lever assembly of claim 17 wherein the master cylinder has an adjustable dead band.

19. A brake lever comprising:
 a) a proximal end that defines a proximal end axis, is rotatable about a pivot axis and is movable in a first plane when the proximal end rotates about the pivot axis,
 b) a sloping transition that extends away from the proximal end axis at an angle, and
 c) a substantially flat region that is movable in a second plane when the proximal end rotates about the pivot axis, wherein the first plane is oriented at an angle to the second plane, and wherein the sloping transition connects the substantially flat region to the proximal end.

20. The brake lever of claim 19 wherein the angle between the first and second planes is between about 10° and about 45°.

* * * * *